July 21, 1931.    D. S. ALMANRODE    1,815,030
THERMOSTATIC CONTROLLING DEVICE
Filed March 23, 1929
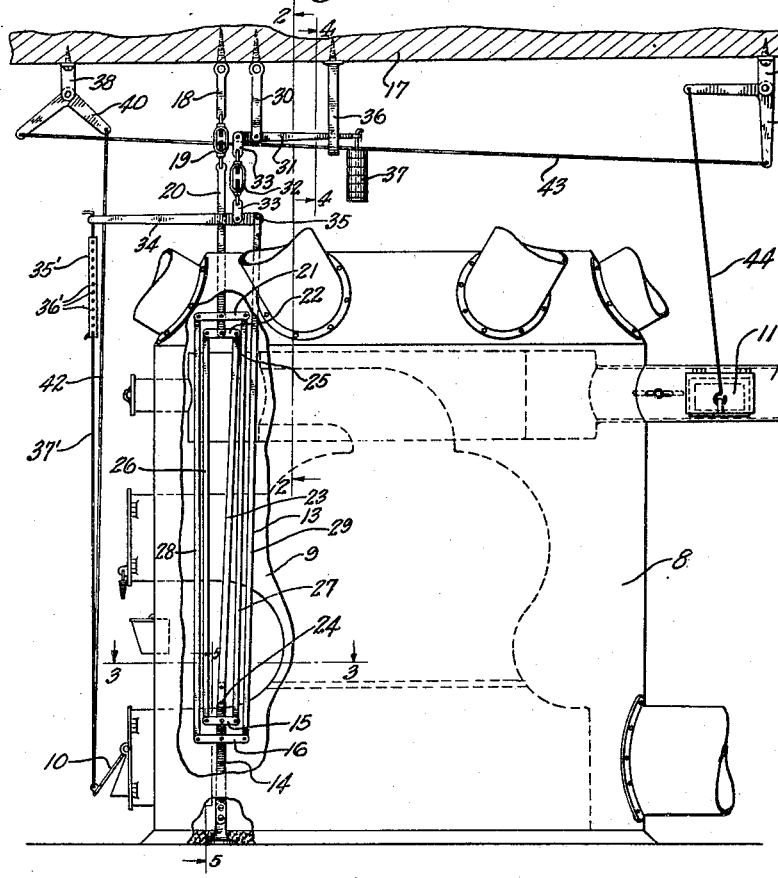
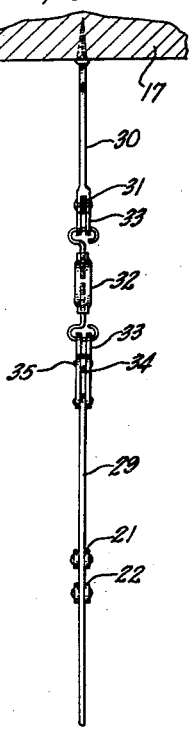
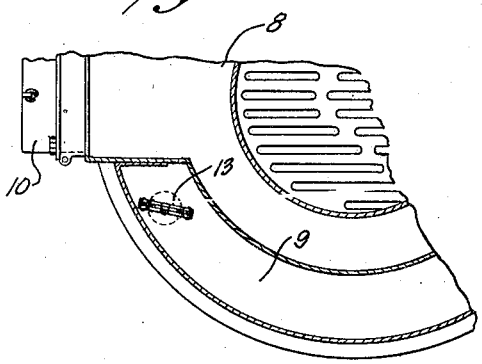
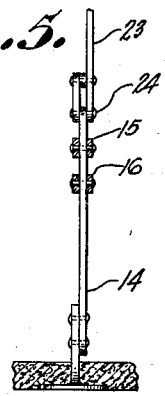
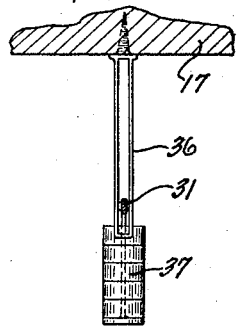
INVENTOR.
David S. Almanrode,
BY
Morsell, Keeney + Morsell
ATTORNEYS.

Patented July 21, 1931

1,815,030

UNITED STATES PATENT OFFICE

DAVID S. ALMANRODE, OF MILWAUKEE, WISCONSIN

THERMOSTATIC CONTROLLING DEVICE

Application filed March 23, 1929. Serial No. 349,371.

This invention relates to improvements in thermostatic controlling devices.

It is one of the objects of this invention to provide an improved thermostatic controlling device which is particularly adapted for controlling the dampers of a furnace to automatically maintain a predetermined temperature in the building to be heated.

A further object of this invention is to provide a thermostatic controlling device in which a novel and efficient form of thermostatic unit is employed, the said thermostatic unit being strong in construction and positive in operation.

It is a further object of this invention to provide a device of the class described having a thermostatic unit which may be positioned in a narrow space, such as the heat chamber of a hot air furnace, where it will be directly acted upon by the heat within said chamber.

A further object of this invention is to provide a thermostatic controlling device which may be readily adjusted to maintain any desired temperature to meet varying weather conditions or personal requirements.

It is a further object of this invention to provide a thermostatic controlling device having means for preventing excess contraction of the thermostatic unit from moving the dampers, or other devices being controlled, beyond their normal limit of travel.

A further object of this invention is to provide a thermostatic controlling device which is simple in construction, efficient in operation, and well adapted for the purpose described.

With the above and other objects in view, the invention consists of the improved thermostatic controlling device, and all its parts and combinations, as set forth in the claim, and all equivalents thereof.

In the accompanying drawings, in which the same reference characters designate the same parts in all of the views:

Fig. 1 is a side view of a hot air furnace, showing the thermostatic controlling device in connection therewith, parts being broken away, and parts being shown in section.

Fig. 2 is an enlarged sectional view of the controlling device taken on line 2—2 of Fig. 1, the furnace being omitted;

Fig. 3 is a fragmentary sectional view taken on line 3—3 of Fig. 1;

Fig. 4 is an enlarged sectional view taken on line 4—4 of Fig. 1; and

Fig. 5 is an enlarged sectional view taken on line 5—5 of Fig. 1, the furnace being omitted.

Referring to the drawings, the numeral 8 designates a hot air furnace having a heat chamber 9, as an ash pit damper 10, and a check damper 11 in the smoke pipe 12, the said dampers being hingedly mounted.

Positioned within the heat chamber 9, and extending vertically therein, is a thermostatic unit, designated generally by the numeral 13. The said unit is constructed as follows: A supporting member 14 is secured rigidly to the bottom of the furnace and extends upwardly therefrom. Equalizer links 15 and 16 are pivoted centrally near the upper end of said supporting member. Depending from the ceiling 17 above the furnace casing is a supporting member 18 carrying an adjustment member 19 on its lower end. Extending downwardly from said adjustment member is an upper supporting bar 20 for the thermostatic unit. Equalizer links 21 and 22 are pivoted centrally on the lower end of said supporting bar. An expansion bar 23 has its lower end pivotally connected to the upper end of the lower supporting member 14, as at 24. The upper end of the bar 23 is pivotally connected to one end of the link 22, as at 25. An expansion bar 26 has its upper end pivotally connected to the other end of the link 22 and has its lower end pivotally connected to one end of the link 15, and another expansion bar 27 is similarly connected between the other end of the link 15 and one end of the link 21. An expansion bar 28 is pivotally connected between the other end of the link 21 and one end of the link 16. Another expansion bar 29 has its lower end pivotally connected to the other end of the link 16 and has its upper end extending slidably through the top of the furnace casing. The bars 23, 26, 27, 28 and 29 are preferably constructed of aluminum, but other materials which are highly sensitive to temperature changes may be employed.

An anchor member 30 extends from the ceiling adjacent the member 18. The said member has a bifurcated lower end portion within which an arm 31 is pivotally mounted. One end of the arm 31 is connected by means of an adjustment member 32 and pivoted links 33 with an arm 34. The said arm has one end pivotally connected to the upper end of the expansion bar 29, as at 35. The other end of the member 31 extends through a U-shaped retaining member 36, the latter extending from the ceiling downwardly. The extreme end of the arm 31 carries a counterweight 37.

Secured to the end of the arm 34 and extending downwardly therefrom is an adjustment member 35' having a plurality of perforations 36' therein. A wire 37', which may be secured to any one of the perforations 36' for adjustment purposes, extends downwardly to the ash pit damper 10.

Extensions 38 and 39, which are secured to the ceiling, and which are positioned above the ash pit dampers and the check dampers, have bell crank levers 40 and 41 respectively pivoted thereto. One end of the bell crank lever 40 is connected by a wire 42 with the ash pit damper. The other end of the bell crank lever 40 is connected by a wire 43 with one end of the bell crank lever 41. The other end of the bell crank lever 41 is connected with the check damper by a wire 44.

The operation of the device is as follows: When the air within the heat chamber 9 of the furnace is heated to a predetermined temperature the bar 23 expands, and through the link 22 this expansion is communicated to the bar 26 and is increased due to the further expansion of the latter member. Through the link 15 movement is transmitted to the bar 27, and through the link 21, the bar 28, and the link 16 the movement is transmitted to the bar 29. The movement of the bar 29 is, therefore, the sum of the movements of all of the bars. As the bar 29 is moved, the outer end of the lever 34 is moved downwardly and the ash pit damper is closed. At the same time, through the wire 42, the bell crank lever 40, the wire 43, the bell crank lever 41 and the wire 44, the check draft 11 is opened. Thus it may be seen that when the furnace has become heated to a desired temperature, the dampers will be automatically controlled so as to check off the drafts to cause the fire to burn with less intensity.

When the air in the chamber 9 is cooled to a predetermined point, the bars of the expansion unit will contract and, by reversal of the movement above described, will cause the damper 10 to be opened again and the damper 11 to be closed. This will cause the fire to burn more rapidly and increase the temperature.

Where excess contraction of the bars of the thermostatic unit occurs, which is greater than the travel the damper will permit, the counterweight will act to relieve the condition, as the contraction will operate against said counterweight, causing the latter to be raised and the pivot point of the arm 34 to be lowered without affecting the pull upon the damper 10.

By means of the adjustment member 35 by means of which the wire 37 may be attached at various points, and by means of the adjustment connections 19 and 32 the device may be set to operate at almost any desired temperature.

Although the thermostatic unit is shown as constructive of five expansible bars, it is obvious that this number may be varied without affecting the efficiency of the device. It is further to be noted that although the device is shown and described in connection with a hot air furnace for operating dampers, it may be used in other types of furnaces or heating devices for controlling either dampers or valves.

From the foregoing description it may be seen that the improved thermostatic controlling device is simple in construction, efficient in operation, and well adapted for the purpose described.

What I claim is:

A thermostatic controlling device for a valve comprising a thermostatic member readily expansible and contractible under temperature changes, a lever pivotally supported at an intermediate point, a weight carried by an end of said lever, a supporting member extending downwardly from the other end of said lever, an operating lever pivotally connected at an intermediate point to said supporting member, said thermostatic member being pivotally connected to one end of said operating lever, and means connected between the other end of said operating lever and said valve for operating the latter upon expansion and contraction of the thermostatic member, said first mentioned lever and weight normally supporting said operating lever in a predetermined position, and excess movement of the thermostatic member operating against said weight to change the position of support of said operating lever without causing further movement of said valve.

In testimony whereof, I affix my signature.

DAVID S. ALMANRODE.